United States Patent [19]
Reven

[11] Patent Number: 4,477,579
[45] Date of Patent: Oct. 16, 1984

[54] ELECTRODE COATING AND COATED ELECTRODES

[75] Inventor: Frederick V. Reven, Homewood, Ill.

[73] Assignee: Nalco Chemical Company, Oak Brook, Ill.

[21] Appl. No.: 484,928

[22] Filed: Apr. 14, 1983

[51] Int. Cl.³ .............................................. C04B 35/00
[52] U.S. Cl. ........................................ 501/1; 106/208; 204/294; 501/30; 501/41; 501/43; 501/153
[58] Field of Search ................... 501/43, 41, 1, 12, 30, 501/153; 423/463; 204/67, 294; 106/208, 14.21, 287.27; 424/67

[56] References Cited

U.S. PATENT DOCUMENTS

| | | | |
|---|---|---|---|
| 1,498,259 | 6/1924 | Bartlett | 106/14.21 |
| 2,791,512 | 5/1957 | Hatch et al. | 106/208 |
| 3,555,146 | 1/1971 | Jones et al. | 424/67 |
| 3,640,093 | 2/1972 | Levene et al. | 501/12 |
| 3,847,853 | 11/1974 | Discich et al. | 501/12 |
| 3,852,107 | 12/1974 | Lorkin et al. | 501/53 |
| 3,947,556 | 3/1976 | Jones et al. | 423/463 |
| 4,025,615 | 5/1977 | Rubino | 424/67 |
| 4,435,510 | 3/1984 | Greensmith et al. | 501/96 |

FOREIGN PATENT DOCUMENTS

| | | | |
|---|---|---|---|
| 53-6213 | 1/1978 | Japan | 204/294 |
| 56-22655 | 3/1981 | Japan | 501/40 |

OTHER PUBLICATIONS

Rawson, H., Inorganic Glass-Forming Systems, Academic Press, NY, (1967), pp. 225–231; 247–248.

Primary Examiner—Helen M. McCarthy
Attorney, Agent, or Firm—John G. Premo; Robert A. Miller; Donald G. Epple

[57] ABSTRACT

Coating for carbon electrodes used as anodes in the electrolysis of alumina to produce aluminum are disclosed. The coatings are aqueous and contain zinc chloride and powdered alumina.

6 Claims, No Drawings

ELECTRODE COATING AND COATED ELECTRODES

INTRODUCTION

Aluminum metal is conventionally prepared by the electrolysis of alumina which is dissolved in molten cryolite. In processes of this type, the aluminum is deposited at the cathode while oxygen is generated at the anode. Both cathode and anode are generally carbon. Due to the generation of oxygen at the anode, the oxygen generated tends to weaken the carbon electrode and wear it prematurely. While various methods have been tried to protect the anode, none to data have been successful with the result being that the carbon electrodes used in such processes must be frequently replaced at great expense.

These electrodes are generally of two distinct types which vary in size depending on the particular design of the electrolytic cell. One type is generally a rectangular block of pure carbon obtained from petroleum coke or pitch coke having an ash content of less than 0.5%. These blocks generally are 90×40×50 centimeters in dimension. Another type of anode frequently used is the so called Soderberg anode. Also made of pure carbon, these electrodes range in size depending upon the design of the electrolytic cell and may weigh as much as 20 tons or more.

It would, therefore, be an advance to the art if a coating could be developed which would protect carbon anodes used during the electrolysis of alumina to produce aluminum.

It would be a further advancement to the art if a coating could be prepared which would extend the life of carbon electrodes used in the electrolysis of alumina to aluminum, such coating being easy to apply and low in cost.

Further advances will appear here and after.

THE INVENTION

This invention is directed to an aqueous coating composition which contains as its principle ingredient zinc chloride and powdered alumina. The coating composition of this invention generally comprises in percentages by weight:
 a. 15-50% zinc chloride
 b. 5-25% powdered alumina
 c. 1-10% alkaliniy control agent
 d. balance water Additionally, the coating composition may optionally contain a suspending agent and a water soluble surface active agent. When coatings of the type described contain these additional ingredients, the coating will generally comprise in percentages by weight:
 a. 15-50% zinc chloride
 b. 5-25% powdered alumina
 c. 1-10% alkali metal hydroxide or carbonate
 d. 0.05-5% suspending agent
 e. 0.05-5% surface active agent
 f. balance water In order to better describe the coating of this invention, each of the ingredients will be described separately.

INGREDIENTS

Zinc Chloride

The zinc chloride employed in the coating composition of this invention may be of a technical grade but should not contain inpurities containing silicon, phosphorus, or boron. The zinc chloride selected should additionally be completely water soluble.

Zinc chloride will generally comprise from 15-50% by weight of the coating composition of this invention, and will preferably be used in 20-40 weight percent of the coating composition. Most preferably approximately 30% zinc chloride will be used in the coating composition.

Powder Alumina

The alumina in the coating composition of this invention will generally be a particle size of from −200 to −400 mesh. Finally, divided alumina is necessary so that it may be suspended in the coating composition to achieve uniformity of application. While larger and or smaller sizes may be used, a preferred particle size is −325 mesh.

The coating composition of this invention generally contains from 5-25, and preferably 10-20% by weight, alumina. Most preferably approximately 15% alumina is employed.

Alkalinity Control Agent

The alkalinity control agent useful in this invention is generally selected from either alkali material hydroxides or carbonates. Sodium hydroxide and sodium carbonate being most preferred. An especially preferred alkalinity control agent is sodium hydroxide. Since the coating composition of the invention is aqueous, it is unimportant as to what form the material is in so long as it is soluble.

Generally from 1-10% by weight and preferably from 2-7% by weight of the alkalinity control agent is used. Most preferably approximately 5 weight percent is employed.

It is believed that at operating temperatures, the alumina, zinc chloride, and alkalinity control agent form a zinc/alumina glass which protects the electrode.

The Suspending Agent

The suspending agents which may be employed in this invention serve to keep the insoluble powdered alumina in suspension so as to ease application. The suspending agents employed may be either naturally occurring such as various starch materials or may be synthetic water-soluble polymers. These materials function by thickening the coating evenly. A preferred suspending agent for use in this invention is Kelzan, a polysaccharide known as a xanthan gum sold by the Kelco Company, or equivalent.

The suspending agent is generally employed at a level of from 0.05-5 and preferably 0.1-3 weight percent. Most preferably approximately 0.3 weight percent of suspending agent is employed.

Surface Active Agent

The surface active agents useful in this invention are water soluble and generally have a high HLB value. It is believed that these materials function in the composition by increasing the wetting ability of the composition upon the carbon electrode to which the composition is applied. While various surface active agents or oil-in-water emulsifying agents can be employed, a preferred material is the dioctylester of sodium sulfosuccinic acid (DOSS). Other surfactants useful can be obtained from McCutcheon's Detergents & Emulsifiers manual using the parameters described.

When the surface active agent is employed in the composition, it will generally be used at a level from 0.05-5% and preferably 0.075-3% by weight of the composition. Most preferably approximately 0.2% by weight is employed.

In the formulation of the composition of this invention, other ingredients may also be employed. As an example, water-soluble biocides may be added to prevent bacteria from attacking the organic components in this composition.

All of the ingredients used in the coating composition should be free of boron, silicon, and phosphorus compounds since these elements are undesirable and may contaminate the electrolytic cell.

The Application of the Composition

The composition of this invention may be applied to carbon electrodes by brush, spraying, and other means. The coating should be uniform on the electrode, and should be of a thickness no more than ½" when dry and preferably no more than ⅛".

EXAMPLES

In order to show the benefits of using the composition of this invention, the following examples are presented.

EXAMPLE 1

A composition was prepared by mixing together the following ingredients in the percentages indicated:

zinc chloride - 67% aqueous solution: 45.0
−325 mesh alumina: 15.0
sodium hydroxide - flake: 5.0
Kelzan: 0.3
dioctylester or sulfosuccinic acid 75% aqueous solution: 0.2
biocide: 0.2
water: balance This material is referred to as Example 1.

EXAMPLE 2

The composition of Example 1, which was tested by coating a carbon electrode maintained at a temperature of 500° F., and then heating to maintain this electrode at a temperature of 950° F. for five hours while maintaining a supply of air in the furnace. At the conclusion of the test and after breaking off the coating, the treated electrode had lost 1-3% of its initial weight. An electrode not so treated and subjected to identical conditions lost from 27-30% of its initial weight.

Thus it is evident that the coating composition of this invention protects carbon electrodes from deterioration in an oxidizing environment.

Having thus described my invention, I claim:

1. A coating composition consisting essentially of in percentages by weight:
   a. 15-50% zinc chloride
   b. 5-25% powdered alumina
   c. 1-10% alkalinity control agent selected from the group consisting of alkali metal hydroxides and alkali metal carbonates
   d. balance water said composition being free of boron, silicon and phosphorus compounds.

2. The composition of claim 1 wherein a-d are present in the following percentages by weight:
   a. 20-40
   b. 10-20
   c. 2-7
   d. balance 3. A coating composition consisting essentially of in percentages by weight:
   a. 15-50% zinc chloride
   b. 5-25% powdered alumina
   c. 1-10% alkali metal hydroxide or carbonate
   d. 0.05-5% suspending agent
   e. 0.05-5% surface active agent
   f. balance water said composition being free of boron, silicon and phosphorus compounds.

4. The composition of claim 3 wherein a-f have the following percentages by weight:
   a. 20-40
   b. 10-20
   c. 2-7
   d. 0.1-3
   e. 0.075-3
   f. balance 5. The composition of claim 1 wherein the powdered alumina has a particle size of from −200 to −400 mesh.

6. The composition of claim 3 wherein the alumina has a particle size of from −200 to −400 mesh.

* * * * *

UNITED STATES PATENT AND TRADEMARK OFFICE
CERTIFICATE OF CORRECTION

PATENT NO. : 4,477,579
DATED : OCTOBER 16, 1984
INVENTOR(S) : FREDERICK V. REVEN

It is certified that error appears in the above-identified patent and that said Letters Patent is hereby corrected as shown below:

ON THE TITLE PAGE ITEM /21/ CHANGE SERIAL NO: 484,928

TO READ SERIAL NO: 484,829

Signed and Sealed this

Sixteenth Day of April 1985

[SEAL]

Attest:

DONALD J. QUIGG

Attesting Officer Acting Commissioner of Patents and Trademarks